United States Patent
Suzuki et al.

(10) Patent No.: US 6,774,625 B2
(45) Date of Patent: Aug. 10, 2004

(54) SEAT POSITION DETECTING DEVICE WITH POSITIONING MEMBER

(75) Inventors: Takashi Suzuki, Obu (JP); Satoru Tagawa, Takahama (JP); Keiji Yasuda, Handa (JP); Hirofumi Endo, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/304,917

(22) Filed: Nov. 27, 2002

(65) Prior Publication Data

US 2003/0160607 A1 Aug. 28, 2003

(30) Foreign Application Priority Data

Nov. 28, 2001 (JP) ........................................ 2001-363414
Nov. 22, 2002 (JP) ........................................ 2002-339678

(51) Int. Cl.[7] ................................................ G01B 7/30
(52) U.S. Cl. ................................ 324/207.24; 324/207.2
(58) Field of Search ........................ 324/207.02–207.26, 324/173, 174; 301/116; 307/116; 280/735; 248/429; 297/330, 344.1; 335/205; 296/65.13; 318/466, 468, 470; 74/89.11, 89.12, 89.15

(56) References Cited

U.S. PATENT DOCUMENTS

| | | | | |
|---|---|---|---|---|
| 5,670,873 A | * | 9/1997 | Onishi et al. ............... | 324/174 |
| 5,698,909 A | * | 12/1997 | Miyazawa ................... | 307/116 |
| 5,747,987 A | * | 5/1998 | Smith ..................... | 324/207.13 |
| 5,751,129 A | * | 5/1998 | Vergin ......................... | 318/467 |
| 5,967,549 A | * | 10/1999 | Allen et al. ................. | 280/735 |
| 6,053,529 A | | 4/2000 | Frusti et al. | |
| 6,055,877 A | * | 5/2000 | Welterlin et al. ........... | 248/429 |
| 6,275,026 B1 | * | 8/2001 | Becker ..................... | 324/207.2 |
| 6,588,710 B1 | * | 7/2003 | Taylor ........................ | 246/220 |
| 6,593,735 B2 | * | 7/2003 | Becker .................. | 324/207.26 |

FOREIGN PATENT DOCUMENTS

JP    2000-310646 A    11/2000

* cited by examiner

Primary Examiner—Jay Patidar
Assistant Examiner—Reena Aurora
(74) Attorney, Agent, or Firm—Burns, Doane, Swecker & Mathis, L.L.P.

(57) ABSTRACT

A seat position detecting device includes a stationary rail fixedly attached to a stationary part, a movable rail movable relative to the stationary rail, a case mounted to one of the stationary rail and the movable rail and housing a position detecting member for detecting a position of the one relative to the other of the stationary rail and the movable rail, and a positioning member formed with the case and extending in a direction of a detected member so as to determine a relative position between the case and the detected member. The positioning member is removable from the case after positioning the case relative to the detected member.

23 Claims, 3 Drawing Sheets

SEAT POSITION DETECTING DEVICE WITH POSITIONING MEMBER

CROSS REFERENCE TO RELATED APPLICATIONS

This application is based on and claims priority under 35 U.S.C. § 119 with respect to a Japanese Patent Application 2001-363414, filed on Nov. 28, 2001 and a Japanese Patent Application 2002-339678, filed on Nov. 22, 2002, the entire content of which is incorporated herein by reference.

FIELD OF THE INVENTION

This invention generally relates to a seat position detecting device. More particularly, this invention pertains to a seat position detecting device capable of detecting a vehicle seat position.

BACKGROUND OF THE INVENTION

There is a known seat position detecting device disclosed as a U.S. Pat. No. 6,053,529. With reference to FIG. 4, the disclosed seat position detecting device includes components such as a movable rail 128 attached to a seat, a stationary rail 130 fixedly attached to a floor section 132, a seat position detecting unit 150 mounted to the stationary rail 130, and a sensor flange 144 mounted to the movable rail 128. The seat position detecting unit 150 is arranged to surround both side surfaces of a downturned leg 148 of the sensor flange 144. A shift position indicating unit 116 is mounted to a vehicle with the seat as a unit after being mounted to the vehicle seat.

Meanwhile, there is a known rotation detecting sensor disclosed as a Japanese Published Application No. 2000-310646. With reference to FIG. 5, the rotation detecting sensor 200 includes a holder 205 formed by resin (PPS) insert molding integrally with a terminal 208 therein. The terminal 208 is made of a metal member such as a brass and possesses one vertically bent end. The holder 205 is integrally provided with a sensor 201 therein, which possesses electronic parts 204, a magnet 203 for generating magnetic flux, a detecting element 202 provided with a Hall IC and the like. The sensor 201 is electrically connected to the terminal 208 and is further connected thereto by soldering or the like. The sensor 201 is separately positioned not to be in contact with a rotation member 230 possessing gears on an outer periphery thereof or slits radially defined in the outer periphery, whereby the sensor 201 can detect the rotation of the rotation member 230 without coming in contact therewith. More particularly, the detecting element 202 detects change of magnetic flux density in response to rotation of the rotation member 230. In this case, the sensor 201 can be arranged only at one side of the rotation member 230 of which rotation is detected by the detecting element 202 with the Hall IC. Therefore, the disclosed rotation sensor 201 can be effectively down sized.

According to the seat position detecting device disclosed as the U.S. Pat. No. 6,053,529, there is a space for the sensor flange 144 to pass between a Hall effect element (not shown) and a magnet (not shown). When the sensor flange 144 is positioned between the Hall effect element and the magnet, the magnetic flux applied to the Hall effect element is decreased. Therefore, the position detecting unit 150 outputs an OFF signal in response to the decrease of the magnetic flux. In this case, it is necessary to keep a space to mount the position detecting unit 150 so as to surround the both side surfaces of the downturned leg 148 of the sensor flange 144 assembled to the vehicle seat.

According to the rotation detecting sensor disclosed as the Japanese Published Application No. 2000-310646, it is necessary to position the sensor 201 relative to the rotation member 230 with a gap for detecting the change of the magnetic flux density by the Hall element (a detecting member) 202. Therefore, if the rotation detecting sensor is applied for the vehicle seat, the rotation detecting sensor may be assembled to the vehicle seat with various assemblies, wherein a desired gap between the sensor 201 and the rotation member (a detected member) 230 may not be able to be ensured.

The present invention therefore seeks to provide an improved seat position detecting device capable of maintaining a constant gap between the detected member and the detecting member.

SUMMARY OF THE INVENTION

According to an aspect of the present invention, a seat position detecting device includes a stationary rail fixedly attached to a stationary part, a movable rail movable relative to the stationary rail, a case mounted to one of the stationary rail and the movable rail and housing a position detecting member for detecting a position of the one relative to the other of the stationary rail and the movable rail, and a positioning member formed with the case and extending in a direction of a detected member so as to determine a relative position between the case and the detected member. The positioning member is removable from the case after positioning the case relative to the detected member.

In this case, the position detecting member can be effectively mounted to the one of the stationary rail and the movable rail while the case and the detected member are in contact with each other. The positioning member can be removed from the case after the position detecting member was mounted to the one. Therefore, a constant gap can be defined between the case housing the position detecting member and the detected member. In this case, even when the movable rail is slidably moved relative to the stationary rail, the detected member can be prevented from coming in contact with the case. Further, the gap between the case and the detected member can be maintained. The detected member can be a position indicating member equipped to the other of the stationary rail and the movable rail. Alternatively, the other of the stationary rail and the movable rail can be used as the detected member.

According to another aspect of the present invention, the positioning member is made of a resin material. Therefore, the positioning member can be easily removed from the case.

According to further aspect of the present invention, the case and the positioning member are integrally formed with a resin material. Therefore, the positioning member can be formed with the case.

According to still further aspect of the present invention, the position of the case relative to either the stationary rail or the movable rail can be adjusted by means of an elongated hole and a pin or a screw. Therefore, the gap between the case and the detected member can be easily adjusted.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
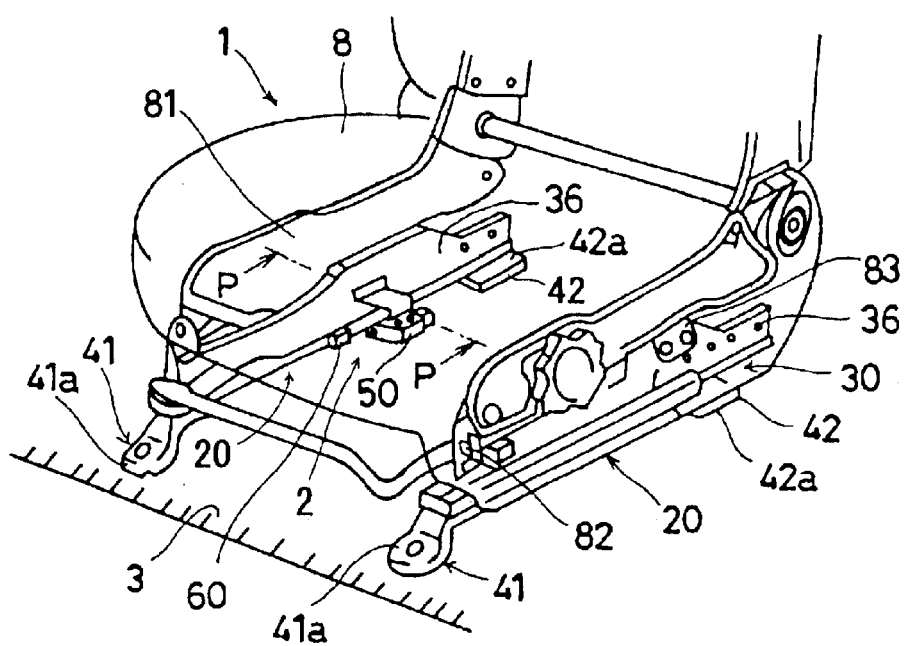
FIG. 1 is a perspective view illustrating an assembled condition of a seat position detecting device to a vehicle seat according to an embodiment of the present invention.

As seen specifically in FIG. 1, a seat position detecting device 2 is disposed between a seat body 1 and a vehicle floor (a stationary part) 3 to which the seat body 1 is attached. The seat position detecting device 2 is mounted to a one portion at either a left-hand side of the seat body 1 or a right-hand side thereof. The seat position detecting device 2 mounted to one of the sides of the seat body 1 is to be understood to possess the same configuration as the other side and so the description below applies to the seat position detecting device 2 at the one side of the seat body 1. Further, although the seat position detecting device 2 according to an embodiment of the present invention is illustrated for use in a manually operated device in FIGS. 1 and 2, the seat position detecting device 2 of the present invention is not limited only for use in the manually operated device (as being illustrated) for manually moving the vehicle seat and can be applicable for use in an electrically operated device for electrically moving the vehicle seat such as a power slide device As seen specifically in FIG. 2, a stationary rail 20 of the vehicle includes a first stationary rail 201 and a second stationary rail 202 fixed to an outer periphery of the first stationary rail 201 by means of a bolt 46 and the like. The stationary rail 20, i.e. the first and second stationary rails 201 and 202, possesses an approximately U shaped cross section being perpendicular with a vehicle longitudinal direction. The first stationary rail 201 is provided with vertical wall portions 23 at both sides of the approximately U shaped cross section and upper ends of the respective vertical wall portion 23 are bent in an inner direction, i.e. in a direction of a central portion in a vehicle lateral direction. The upper ends of the vertical wall portions 23 further downwardly extend to form engaging portions 24, respectively.

A front bracket 41 is connected to a lower surface 25 of the stationary rail 20 and at a front end portion in the longitudinal direction thereof and a rear bracket 42 is connected to the lower surface 25 of the stationary rail 20 and at a rear end portion in the longitudinal direction thereof. The respective brackets 41 and 42 are integrally provided with attached portions (not shown) attached to the stationary rail 20 and leg portions 41a and 42a attached to the vehicle floor 3 by means of bolts (not shown).

The movable wall 30 is arranged inside the approximately U-shaped first stationary rail 201 and possesses an approximately inverted U-shaped cross section opened downwardly. Bottom ends of vertical walls portions 33 at both sides of an upper wall portion 35 of the movable rail 30 are outwardly bent so as to form engaged portions 34 slidably engaged to the engaging portions 24 of the first stationary rail 201 via shoes 38 which are provided at the engaging portions 24. There is a roller 39 disposed between a lower surface of each engaged portion 34 and the first stationary rail 201. Therefore, the movable rail can be smoothly moved in the vehicle longitudinal direction relative to the first stationary rail 201.

The second stationary rail 202 possessing an approximately U-shaped structure is provided with flanges 202A at both sides thereof. One of the flanges 202A is equipped with a detected member 60 (a position indicating means) made of a magnetic material such as steel. The movable rail 30 is integrally provided with an upper vertical wall portion 36 extending in the vehicle longitudinal direction The upper vertical wall portion 36 is equipped with a front bracket 82 and a rear bracket 83. As illustrated in FIG. 1, a lower arm 81 is disposed inside a seat cushion 8, on which an occupant is seated, and is assembled to the vertical wall portion 36 of the movable rail 30 via the brackets 82 and 83. The lower arm 81 and the cushion 8 can be movable in the vehicle longitudinal direction with the movable rail 30 relative to the stationary rail 20. The vertical wall portion 36 of the movable wall 30 is equipped with a stationary bracket 56 made of a plate horizontally extending in the central portion of the seat body 1 and possessing an L-shaped cross section.

Figure 2:
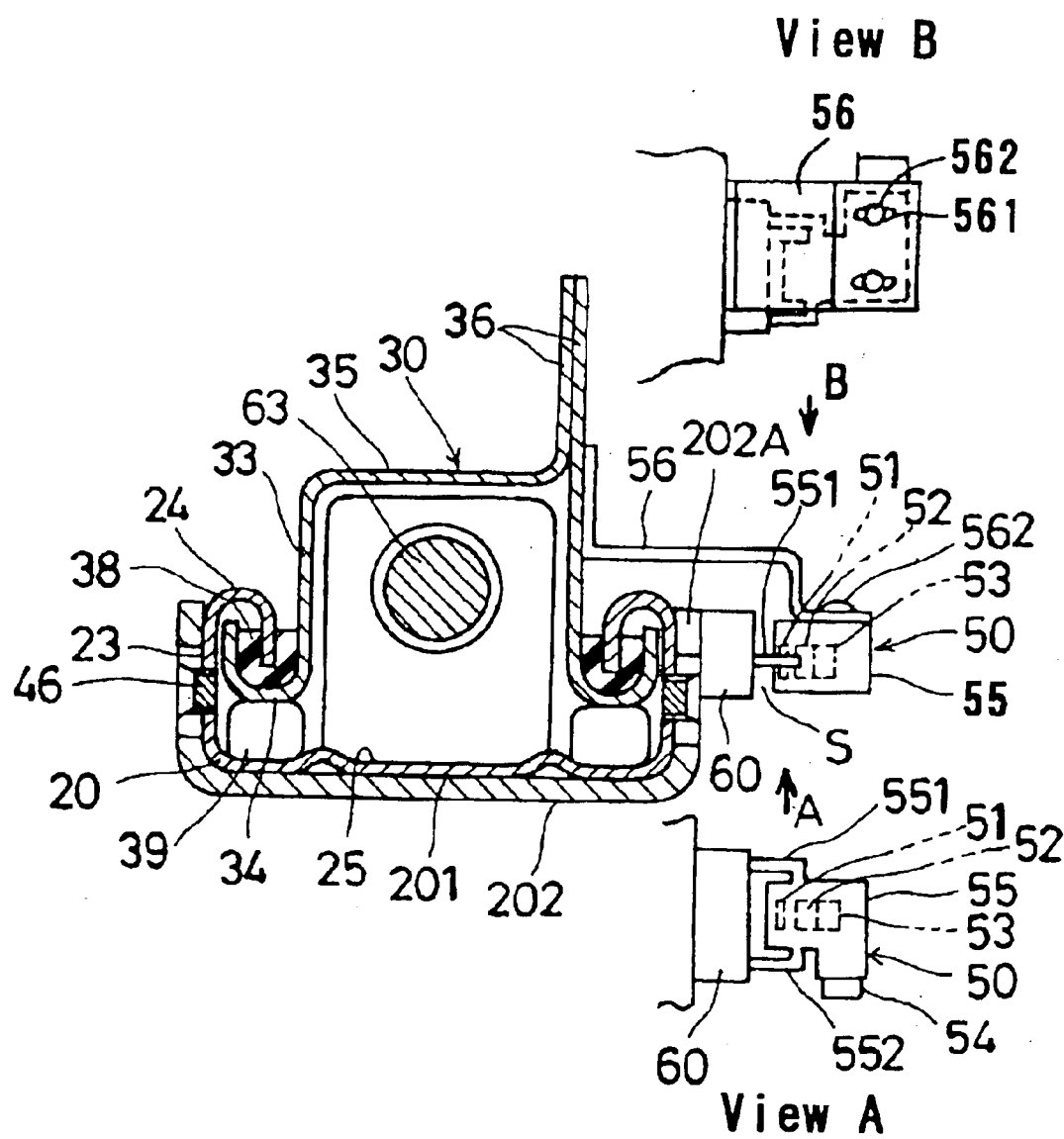
FIG. 2 is a cross sectional view of the seat position detecting device, taken along a line P—P in FIG. 1.
Figure 3:
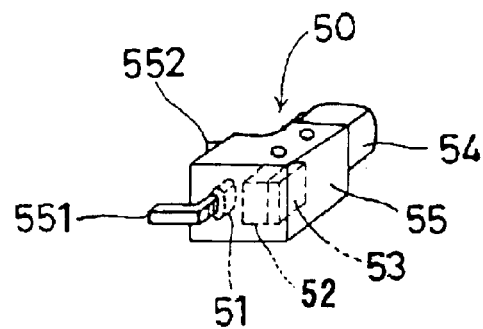
FIG. 3 is a perspective view illustrating a seat position detecting unit illustrated in FIG. 1.
Figure 4:
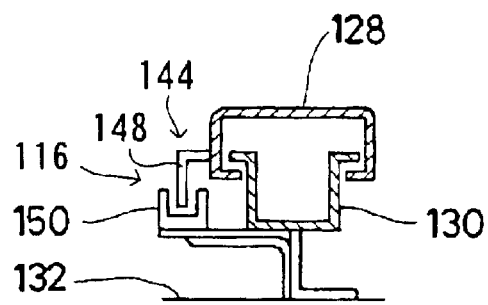
FIG. 4 is a partially cross sectional view of a stationary rail, a movable rail, and a portion around a sensor which all are included in a seat position detecting device related to the present invention.
Figure 5:
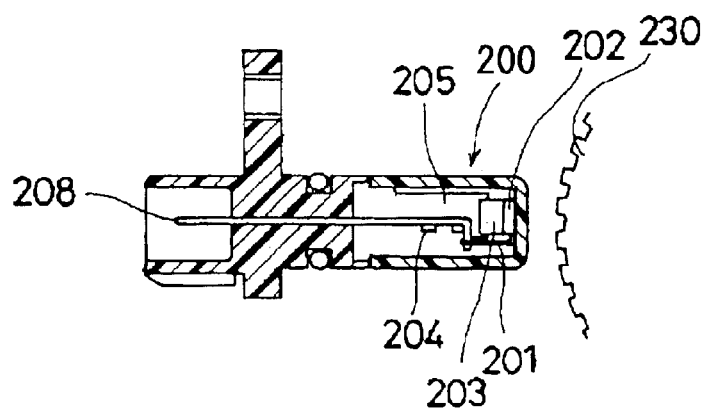
FIG. 5 is a cross sectional view illustrating a rotation detecting sensor related to the present invention.

As illustrated in FIGS. 2 and 3, a position detecting sensor 50 (a position detecting means) includes components such as a Hall effect element 51 as a magnetic force-voltage converting element, a magnet 52 arranged in parallel with the Hall effect element 51, a yoke 53, and a connector 54 electrically connected to the Hall effect element 51. As illustrated in FIGS. 2 and 3, there is a predetermined distance defined between the Hall effect element 51 and the magnet 52. The above-described components of the position detecting sensor 50 is housed in a case 55 as a unit. Therefore, according to the embodiment of the present invention, the position detecting sensor 50 can be effectively down sized and can be mounted with higher reliability. One end of the stationary bracket 56 is fixed to the vertical wall portion 36 and the other end thereof is fixed to the case 55. Therefore, the case 55 can be secured by the stationary bracket 56. In this case, the case 55 is secured by the stationary bracket 56 to assure a gap S between the case 55 and the detected member 60.

Further, as shown in FIG. 2 and associated View A, the case 55 housing the position detecting sensor 50 is formed with positioning members 551 and 552 each of which has a pin shape and extends in a direction of the detected member 60. The positioning members 551 and 552 are made of a resin material such as thermoplastic resin or thermosetting resin. Therefore, the positioning members 551 and 552 are formed integrally with the case 55 with a resin material. When the case 55 is assembled to the movable rail 30 via the stationary bracket 56, as shown in FIG. 2 and associated View B, the position of the case 55 can be adjusted by means of an elongated hole 561 and a sensor fixing screw (alternatively, it can be a pin) 562. Each resin made positioning members 551 and 552 is of an L-shape structure so as to be easily removed from the case at fixed portions to the case.

According to the embodiment of the present invention, the case 55 of the position detecting sensor 50 is formed with the positioning members 551 and 552 for adjusting the position to mount the position detecting senor 50 to the upper rail 30. The detected member 60 is made of a magnetic material so as to change magnetic flux density when being positioned close to the magnet 52. The case 55 is assembled to the movable rail 30 so as to position tip ends of the positioning member 551 and 552 to be in contact with the detected member 60. The case 55 is fixed to the stationary bracket 56 by means of the sensor stationary screw 562 during being positioned in the above matter. In this case, the gap between the case 55 and the detected member 60 is determined based upon dimensions of the positioning members 551 and 552. Therefore, the position detecting sensor 50 can be assembled to the vehicle seat by absorbing fluctuation of the gap caused due to assembling of the movable rail 30 to the stationary rail 20. According to the embodiment of the present invention, the case 55 is positioned with the two positioning members 551 and 552. However, the case 55 can be positioned by a single positioning member as well.

The positioning members 551 and 552 can be removed from the case 55 by being applied with load after fixing the case 50 to the bracket 60 by means of the sensor fixing screw 562. Therefore, displacement of the position detecting sensor 50 can be restrained, which occur due to the contact of the positioning members 551 and 552 with the detected member 60, when the position detecting sensor 50 is actually utilized.

As described above, the Hall effective element 51 and the magnet 52 housed in the case 55 are arranged at one side of the detected member 60. Further, the positioning members 551 and 552 are provided for positioning the case 55 relative to the detecting member 60. Therefore, the position detecting sensor 50 can be effectively down sized and the position of the case 50 can be adjusted.

Next, operation of the seat position detecting device 2 is described hereinbelow.

The Hall effect element 51 as a magnetic force-voltage converting element outputs an electric signal representing magnetic field intensity by use of a Hall effect. The position detecting sensor 50 includes the Hall effect element 51, the magnet 52, and the yoke 53. The Hall effect element 51 usually detects the magnetic field intensity defined by magnetic force of the magnet 52. The detected member 60 is positioned at a predetermined position of the stationary rail 20. When the stationary rail 20 is positioned at a predetermined position relative to the movable rail 30 moved in the longitudinal direction, one of the side surfaces of the detected member 60 is arranged facing the Hall effect element 51 and the magnet 52. In this case, the magnetic field intensity of the magnet 52 is changed by the detected member 60.

As described above, when the detected member 60 is adjacent to the seat position detecting device 2, the magnetic flux generated around the magnet 52 passes over the yoke 53 and the detected member 60, wherein a magnetic flux density passing a portion of the Hall element 51 is increased. Therefore, the Hall effect element 51 detects a magnetic field intensity being different from a magnetic field intensity which the Hall effect element 51 usually detects. The movable rail 30 can be judged whether or not being positioned at the predetermined position relative to the stationary rail 20, based upon the change of the magnetic field intensity.

According to the embodiment of the present invention, the detected member 60 extends in a vehicle forward direction from the predetermined position. Therefore, the detected member 60 can indicate that the movable rail 30 is positioned in a forward direction relative to the predetermined position, i.e. that the seat body 1 is positioned in a forward direction relative to a predetermined position. The above-described seat position detection is applied for controlling of an air bag projection amount corresponding to the detected seat position.

According to the embodiment of the present invention, the detected member 60 is fixed to the stationary rail 20. However, when the stationary rail 30 is made of a magnetic material, the stationary rail 30 can be utilized as a detected member.

According to the embodiment of the present invention, the position detecting sensor 50 is fixed to the movable rail 30 via the stationary bracket 56 and the detected member 60 is fixed to the stationary rail 20. However, the position detecting sensor 55 can be equipped to the stationary rail 20 so as to detect the position of the movable rail 20.

The principles, preferred embodiments and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A seat position detecting device comprising:
    a stationary rail fixedly attached to a stationary part;
    a movable rail movable relative to the stationary rail;
    a case mounted to one of the stationary rail and the movable rail and housing a position detecting means for detecting a position of the one relative to the other of the stationary rail and the movable rail; and
    a positioning member formed with the case and extending in a direction of a detected member provided at the stationary rail so as to determine a relative position between the case and the detected member, wherein the positioning member is removable from the case after positioning the case relative to the detected member.

2. A seat position detecting device according to claim 1, wherein the positioning member is made of a resin material.

3. A seat position detecting device according to claim 1, wherein the case and the positioning member are integrally formed.

4. A seat position detecting device according to claim 3, wherein the positioning member and the case are integrally formed with a resin material.

5. A seat position detecting device according to claim 1, wherein the position of the case relative to the one of the stationary rail and the movable rail is adjustable by means of an elongated hole and a pin.

6. A seat position detecting device according to claim 1, wherein the position of the case relative to the one of the stationary rail or the movable rail is adjustable by means of an elongated hole and a screw.

7. A seat position detecting device according to claim 1, further comprising:
    the position detecting means including:
        a magnetic force-voltage converting element;
        a magnet arranged in parallel with the magnetic force-voltage converting element;
        a yoke arranged at an opposite side of the magnetic force-voltage converting element relative to the magnet;

a connector electrically connected to the magnetic force-voltage converting element, wherein the magnetic force-voltage converting element, the magnet, the yoke, and the connector are housed in the case as a unit.

8. A seat position detecting device according to claim 7, wherein either one of the stationary rail and the movable rail is made of a magnetic material and is utilized as the detected member.

9. A seat position detecting device according to claim 8, wherein a magnetic flux intensity detected by the magnetic force-voltage converting element is changed by the detected member and the other integrally made of the magnetic material when the position detecting means comes close to the detected member and the other.

10. A seat position detecting device according to claim 7, wherein the detected member is a position indicating means mounted on the other of the stationary rail and the movable rail.

11. A seat position detecting device according to claim 10, wherein a magnetic flux intensity detected by the magnetic force-voltage converting means is changed by the position indicating means when the position detecting means comes closed to the position indicating means.

12. A seat position detecting device for a vehicle seat comprising:
    a stationary rail fixedly attached to a vehicle floor;
    a movable rail mounting the vehicle seat thereon and being movable relative to the stationary rail;
    a case mounted to the movable rail and housing a position detecting means for detecting a position of the movable rail relative to the stationary rail; and
    a positioning member formed with the case and extending in a direction of a detected member provided at the stationary rail so as to determine a relative position between the case and the detected member, wherein the positioning member is removable from the case after positioning the case relative to the detected member.

13. A seat position detecting device according to claim 12, wherein the positioning member is made of a resin material.

14. A seat position detecting device according to claim 12, wherein the case and the positioning member are integrally formed.

15. A seat position detecting device according to claim 12, wherein the positioning member and the case are integrally formed with a resin material.

16. A seat position detecting device according to claim 12, wherein the position of the case relative to the stationary rail is adjustable by means of an elongated hole and a pin.

17. A seat position detecting device according to claim 12, wherein the position of the case relative to the stationary rail is adjustable by means of an elongated hole and a screw.

18. A seat position detecting device according to claim 12, further comprising:
    the position detecting means including:
        a magnetic force-voltage converting element;
        a magnet arranged in parallel with the magnetic force-voltage converting element;
        a yoke arranged at an opposite side of the magnetic force-voltage converting element relative to the magnet;
        a connector electrically connected to the magnetic force-voltage converting element, wherein the magnetic force-voltage converting element, the magnet, the yoke, and the connector are housed in the case as a unit.

19. A seat position detecting device according to claim 18, wherein ether one of the stationary rail and the movable rail is made of a magnetic material and is utilized as the detected member.

20. A seat position detecting device according to claim 19, wherein a magnetic flux intensity detected by the magnetic force-voltage converting element is changed by the detected member and the stationary rail integrally made of the magnetic material when the position detecting means comes close to the detected member and the stationary rail.

21. A seat position detecting device according to claim 18, wherein the detected member is a position indicating means mounted on the stationary rail.

22. A seat position detecting device according to claim 21, wherein a magnetic flux intensity detected by the magnetic force-voltage converting means is changed by the position indicating means when the position detecting means comes closed to the position indicating means.

23. A seat position detecting device according to claim 22, wherein the position indicating means extends from a predetermined position on the stationary rail in a vehicle forward direction.

* * * * *